(12) United States Patent
Takahashi

(10) Patent No.: US 8,278,029 B2
(45) Date of Patent: Oct. 2, 2012

(54) STAMPER PRODUCTION METHOD AND READ-ONLY OPTICAL DISC PRODUCTION METHOD

(75) Inventor: Kensaku Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 4 days.

(21) Appl. No.: 12/689,602

(22) Filed: Jan. 19, 2010

(65) Prior Publication Data

US 2010/0183986 A1 Jul. 22, 2010

(30) Foreign Application Priority Data

Jan. 20, 2009 (JP) ................. 2009-009519

(51) Int. Cl.
*G03F 7/20* (2006.01)
*B44C 1/22* (2006.01)

(52) U.S. Cl. .......................... 430/321; 216/67

(58) Field of Classification Search .......... None
See application file for complete search history.

(56) References Cited

U.S. PATENT DOCUMENTS 7,372,801 B2 * 5/2008 Lee et al. ................ 369/275.4
7,548,505 B2 * 6/2009 Endoh et al. ............ 369/275.4
2002/0182546 A1 * 12/2002 Konishi et al. ............ 430/321
2005/0128926 A1 * 6/2005 Kai et al. .................. 369/125

FOREIGN PATENT DOCUMENTS

| JP | 2003-009284 A | 1/2003 |
| JP | 2003-315988 A | 11/2003 |
| JP | 2005-100597 A | 4/2005 |
| JP | 2007-287261 A | 11/2007 |
| JP | 2008-087476 A | 4/2008 |
| WO | WO 03/009284 A1 | 1/2003 |
| WO | WO 2008/053999 A1 | 5/2008 |

* cited by examiner

*Primary Examiner* — Cynthia Kelly
*Assistant Examiner* — Anna Verderame
(74) *Attorney, Agent, or Firm* — Wolf, Greenfield & Sacks, P.C.

(57) ABSTRACT

A stamper production method includes: a stamper forming step of producing, by electroplating processing using a matrix in which a pit string constituted of a concave pit is formed on an inorganic resist layer based on recording information, a stamper on which a convex pit corresponding to the concave pit is formed; and an etching step of carrying out etching processing on the stamper so that a reduction ratio of a pit height of a short pit becomes larger than that of a long pit regarding the convex pit of the stamper.

7 Claims, 10 Drawing Sheets

Normal process

Process of embodiment

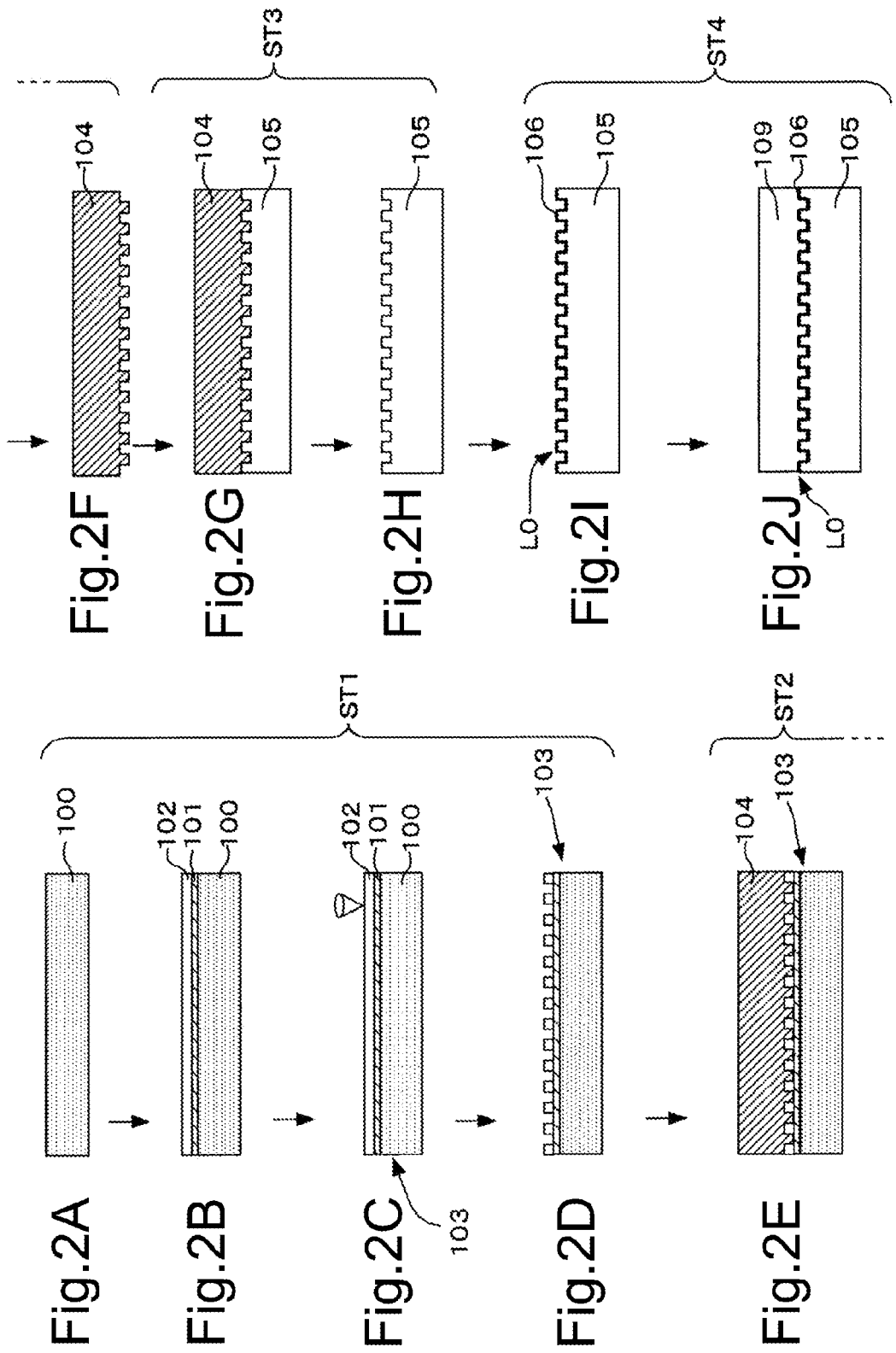

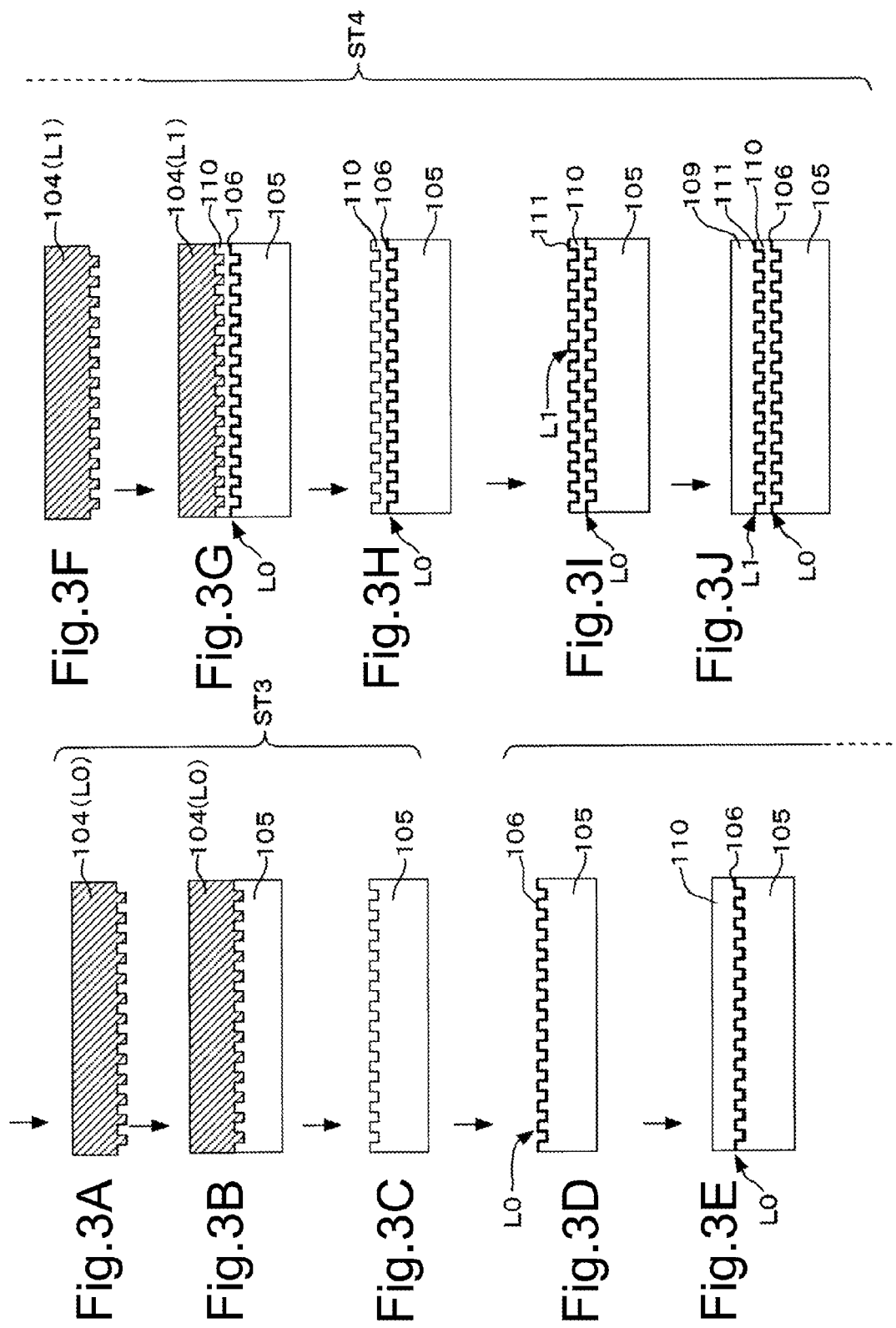

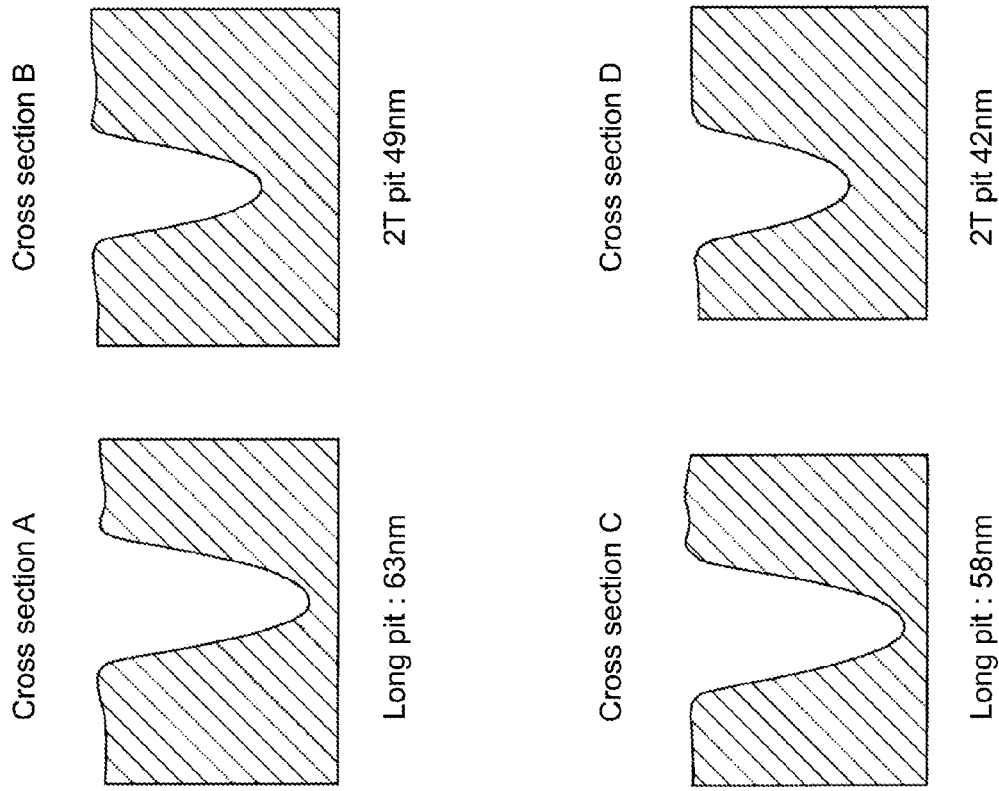
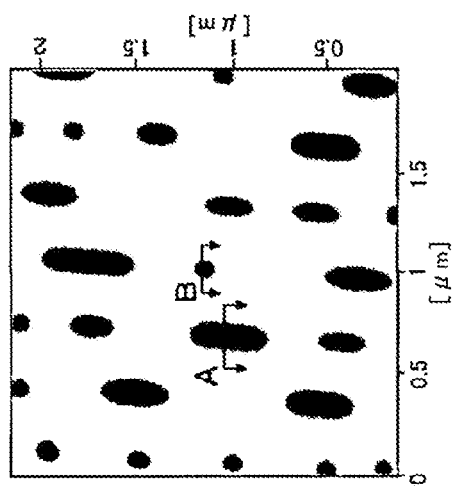
Fig.5A Disc based on unetched stamper
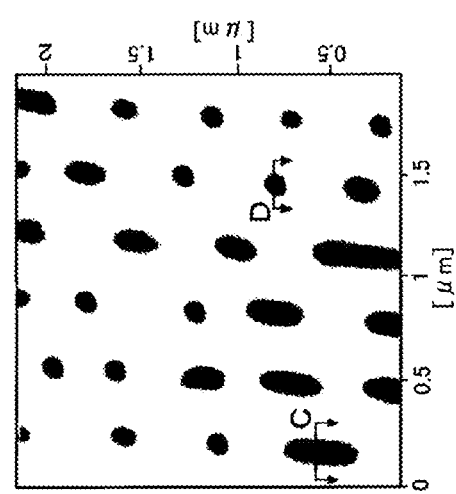
Fig.5B Disc based on etched stamper ○ : Disc after stamper etching process ✕ : Disc not subjected to stamper etching process

STAMPER PRODUCTION METHOD AND READ-ONLY OPTICAL DISC PRODUCTION METHOD

BACKGROUND OF THE INVENTION

1. Field of the Invention

The present invention relates to a method of producing a stamper used for producing an optical disc and a read-only optical disc production method.

[Patent Document 1] Japanese Patent Application Laid-open No. 2007-287261
[Patent Document 2] Japanese Patent Translation Publication No. 2003/009284

2. Description of the Related Art

In recent years, along with a densification of optical discs, a Blu-ray disc (registered trademark) is widely used as a high-density optical disc, for example.

While DVDs (Digital Versatile Discs) already in wide use each have a storage capacity of 4.7 GB (Giga Bytes) (single recording layer), Blu-ray discs each have a storage capacity as large as 25 GB. Such a densification is made possible by miniaturizing a pit pattern in a disc matrix mastering process.

In a mastering process of DVDs of the past, an organic resist subjected to a laser exposure has been sensitized by a photon mode. A photon-mode recording area is proportional to an exposure spot diameter and has a resolution almost equal to a half-value width of the spot diameter. The exposure spot diameter $\phi$ is expressed by $\phi=1.22*\lambda/NA$, where $\lambda$ represents a laser wavelength and NA represents a numerical aperture of a lens.

In contrast, in the mastering process of Blu-ray discs, cutting is performed with a resist that uses an inorganic material (inorganic resist) and with which a resolution can be significantly improved.

A read-only Blu-ray disc, that is, a ROM-type Blu-ray disc (hereinafter, also referred to as "BD-ROM") onto which information is recorded by concavoconvex emboss pit patterns is produced as follows.

First, cutting of a matrix that uses an inorganic resist and development processing are carried out to thus obtain a matrix on which a pit pattern is formed. Then, using the matrix, stampers are formed by a nickel electroplating process. The stampers are obtained by inversely transferring the pit pattern of the matrix.

After that, plastic substrates (disc substrates) are formed by injection molding using the stampers, and a reflective film, a cover layer, and the like are formed on each of the formed disc substrates, to thus obtain a final optical disc.

Here, when producing optical disc products expected to be of a high demand as in a case of providing hit movies in discs, it may be necessary to efficiently produce an enormous amount of optical discs.

Therefore, in the case of BD-ROMs, a production method that enables a large number of stampers to be produced from a single matrix is demanded.

Unlike a matrix that uses an organic resist in the related art, the matrix that uses an inorganic resist is capable of producing a large number of stampers from a single matrix.

As shown in FIG. 7, if a large number of master stampers Ma (Ma#1, Ma#2, Ma#3, . . . ) can be formed from a single matrix, injection molding can be carried out in parallel using the master stampers Ma to thus produce disc substrates.

Further, each of the master stampers Ma is plated again, and mother stampers MT (MT#1, MT#2, . . . ) whose concavities and convexities are inverted from those of the master stampers Ma are thus formed. Then, son stampers SN (SN#1, SN#2, . . . ) whose concavities and convexities are further inverted from those of the mother stampers MT are formed. As a result, also by using the son stampers SN, disc substrates can be produced by carrying out the injection molding in parallel.

This is a desirable copying process for a mass production because, if a large amount of master stampers Ma and son stampers SN (i.e., stampers that can be used for injection molding) can be produced exponentially from a single matrix, disc substrates can be produced in parallel using those stampers, with the result that an improvement in efficiency of the whole process and a short-term mass production can both be realized.

SUMMARY OF THE INVENTION

However, if the master stampers Ma are produced repetitively from a matrix, the later in time the stampers are produced, the more the signal characteristics of the optical discs produced based on those stampers deteriorate. Particularly a problem on asymmetry is caused as described below.

An optical disc reproduction method generally involves irradiating semiconductor laser light onto a disc and detecting return light thereof. Signal characteristics are evaluated by accurately reproducing recorded digital signals. During reproduction, a 25-GB BD-ROM rotates at a linear velocity of 4.92 m/s, specified to have 1 clock of 15.15 ns, and is constituted of pits and spaces of 2T to 8T (30.30 ns to 121.20 ns) (T represents channel clock cycle).

A reproduction waveform on an analog oscilloscope (so-called eye pattern) is shown in FIG. 8. In a read-only optical disc, since a diffraction effect becomes larger as intervals of concavities and convexities of pits and spaces become smaller, an MTF becomes small and a modulation degree decreases. Thus, an amplitude of a 2T signal is minimized.

It should be noted that in FIG. 8, "I8H" is a peak level of an 8T pattern, "I2H" is a peak level of a 2T pattern, "I2L" is a bottom level of the 2T pattern, and "I8L" is a bottom level of the 8T pattern.

In an actual reproduction apparatus, a waveform detected as an analog signal is amplified by a nonlinear equalizer to correct an amplitude difference that depends on a pit length, and a specific voltage level in the vicinity of a center of an amplitude is set as a threshold to binarize the waveform into 0 and 1.

As an index of the signal evaluation, mainly jitter, asymmetry, and modulation can be exemplified. The jitter (deviation from regular clock) is represented by $\sigma/T$ using a standard deviation $\sigma$ and 1T.

It is considered that the larger the value of the jitter is, the more deteriorated the reproduction signal becomes. In the BD-ROM with a single recording layer, the jitter is specified to be 6.5% or less in standard, but it is of course the lower the better. In an actual production, the jitter needs to be 6% or less in view of a margin.

The modulation (modulation degree) is expressed by (I8H−I8L)/(I8H). This is a magnitude of the 8T amplitude and an index that depends on a depth of the 8T pit. A C/N ratio becomes higher as the value increases.

The asymmetry is expressed by {(I8H+I8L)−(I2H+I2L)}/{2(I8H−I8L)} and indicates a deviation of center axes of the 8T signal and the 2T signal. This asymmetry is an important index for determining a threshold for binarization. Though the asymmetry is specified to be −10% to 15% in the BD-ROM standard, it is desirably about 0% to 10% in general.

A value of the asymmetry is a signal obtained by differentiating the sizes of the long pit (e.g., 8T pit) and the 2T pit, but is largely affected by a minimal change in sizes to cause a fluctuation.

In a high-density disc such as a Blu-ray disc, if a pit depth changes minimally in a nm order, signal characteristics to be obtained largely change.

In a general optical disc production process, a nickel electroplating method is used for producing stampers, and for realizing an efficient mass production, a large number of master stampers need to be obtained from a single matrix as described above.

However, it is confirmed that a pit configuration of a matrix that has been subjected to an acidic plating solution for a long time or subjected to a process of peeling off coated nickel (Ni) from the matrix changes uniformly in a several-nm order irrespective of the pit size every time electrocasting is carried out.

FIG. 9A shows a result of measuring a pit height of the master stampers Ma formed from a single matrix. It should be noted that "Ma#1" represents a master stamper prepared first and "Ma#5" represents a master stamper prepared in the fifth electrocasting process. Thus, "#n" indicates an n-th stamper copied from a single matrix.

As shown in FIG. 9A, the pit height of the produced stampers decreases every time the stamper is copied. This is due to the fact that the depth of the concave pit of the matrix gradually becomes smaller.

FIG. 9B schematically shows an initial pit configuration (solid line) of a matrix and a pit configuration thereof obtained after the electrocasting process (broken line). The pit depth becomes smaller due to, for example, the inorganic resist layer of the matrix gradually melting by being subjected to a plating solution or peeling of a surface adhered onto the stamper side at the time the stamper is peeled off.

The depth of the concave pits of the matrix becomes smaller and the height of the convex pits of the stamper becomes lower every time copying is repeated as described above. As a result, the later in time the stampers are produced, the more the pits (concave pits) become shallower in the optical discs formed based on those stampers.

Consequently, optical discs (BD-ROMs) as final products produced based on the master stampers Ma#1 to Ma#10, for example, have different signal characteristics. In other words, the smaller the pit depth of the optical disc is, the more the signal characteristics such as jitter, asymmetry, and modulation deteriorate. Asymmetry is particularly a problem in terms of practical use.

FIGS. 10A to 10C respectively show results of measuring jitter, asymmetry, and modulation of optical discs produced from the master stampers Ma#(n) at each copying stage.

As shown in FIG. 10A, jitter is enhanced as the number of times copying is made increases. For the jitter to be 6.5% or less, the master stampers Ma that can be used for the production are about 7 master stampers from the master stamper Ma#1 to the master stamper Ma#7.

Also the modulation of FIG. 10C is deteriorated as the number of times copying is made increases. However, the modulation is practically negligible since the optical disc is originally a read-only optical disc having a high reflectance.

However, the asymmetry that is generally desired to be 0% to 10% is as shown in FIG. 10B, so the master stamper Ma#3 is already unsuitable. As a result, practically, only one or two master stampers Ma can be used for the production.

The fact that only an extremely-small number of master stampers Ma can be obtained from a single matrix is extremely inconvenient when wishing to mass-produce BD-ROM products of hit movies, for example.

For example, matrix mastering needs to be carried out again when producing a large number of stampers. In the matrix mastering, since a productivity is largely oppressed by production times and costs, it is desirable to enable a large number of master stampers to be obtained from a single matrix.

In this regard, there is a need for a stamper production method and a read-only optical disc production method that are capable of improving a productivity in mass-producing a read-only optical disc and forming a large number of stampers from a single matrix. In other words, there is a need to enable even the stampers obtained after copying is repeated some number of times to be used in an actual production process.

According to an embodiment of the present invention, there is provided a stamper production method including: a stamper forming step of producing, by electroplating processing using a matrix in which a pit string constituted of a concave pit is formed on an inorganic resist layer based on recording information, a stamper on which a convex pit corresponding to the concave pit is formed; and an etching step of carrying out etching processing on the stamper so that a reduction ratio of a pit height of a short pit becomes larger than that of a long pit regarding the convex pit of the stamper.

Moreover, the etching step is carried out as dry etching that uses an argon plasma.

Further, the etching step includes carrying out dry etching using an oxygen plasma after the dry etching that uses the argon plasma.

According to an embodiment of the present invention, there is provided a read-only optical disc production method including: a matrix production step of producing, by performing a pit pattern exposure by irradiating recording laser light that is based on recording information onto an inorganic resist layer of a matrix substrate and performing development processing after the exposure, a matrix in which a pit string constituted of a concave pit is formed on the inorganic resist layer based on the recording information; a stamper forming step of producing, by electroplating processing using the matrix, a stamper on which a convex pit corresponding to the concave pit is formed; an etching step of carrying out etching processing on the stamper so that a reduction ratio of a pit height of a short pit becomes larger than that of a long pit regarding the convex pit of the stamper; a disc substrate preparation step of preparing, using the stamper subjected to the etching step, a disc substrate onto which the concave pit corresponding to the convex pit is transferred; and a layer structure forming step of forming a predetermined layer structure on the disc substrate to produce a read-only optical disc.

Further, the layer structure forming step includes forming a recording layer by depositing a reflective film on a surface of the disc substrate on which the pit string constituted of the concave pit, that has been transferred from the stamper subjected to the etching step, is formed, and forming a cover layer on the recording layer.

Alternatively, the layer structure forming step includes depositing a reflective film on a surface of the disc substrate on which the pit string constituted of the concave pit, that has been transferred from the stamper subjected to the etching step, is formed to thus obtain a first recording layer, forming, after obtaining the first recording layer, a second recording layer and subsequent layers via an intermediate layer by a pit string transfer using a different stamper produced through the matrix production step, the stamper forming step, and the etching step and a deposition of a semi-transmissive reflective film, and forming a cover layer on the last recording layer.

Moreover, according to another embodiment of the present invention, there is provided a read-only optical disc production method for producing a read-only optical disc, that is used for mass-producing read-only optical discs having the same information content, the method including: producing, by performing a pit pattern exposure by irradiating recording laser light that is based on recording information onto an inorganic resist layer of a matrix substrate and performing development processing after the exposure, a matrix in which a pit string constituted of a concave pit is formed on the inorganic resist layer based on the recording information; producing, by performing electroplating processing a plurality of times using the matrix, a plurality of stampers on each of which a convex pit corresponding to the concave pit of the matrix is formed; carrying out, while targeting stampers formed by the electroplating processing after the electroplating processing is carried out a predetermined number of times using the matrix, etching processing on the target stampers so that a reduction ratio of a pit height of a short pit becomes larger than that of a long pit regarding the convex pit of the target stampers; and preparing, using the plurality of stampers formed from the matrix that include the stamper that has been subjected to the etching processing and the stamper that has not been subjected to the etching processing in parallel, a disc substrate onto which the concave pit corresponding to the convex pit of the stamper is transferred, and forming a predetermined layer structure on the disc substrate, to thus produce a read-only optical disc.

According to the embodiments of the present invention, asymmetry values can be controlled by carrying out the etching processing on the stampers onto each of which the pit has been transferred from the matrix in the process of producing a high-density read-only optical disc such as a BD-ROM.

As described above, for mass-producing an optical disc, a large number of master stampers need to be copied from the matrix using electroplating. However, the asymmetry values specified by the standard increase as the number of times the master stampers are copied from the matrix increases.

In this regard, master stampers whose asymmetry values increase due to a repetition of the electrocasting process are subjected to the etching processing to thus reduce the asymmetry values.

The increase of the asymmetry values is attributable to a fact that, when the stamper copying is repeated, a height of the convex pit (depth of concave pit on optical disc) becomes lower for the stampers produced later in time, irrespective of whether the pit is a long pit or a short pit. Here, the etching step of performing the etching processing on the stampers so that the reduction ratio of the pit height of the short pit becomes larger than that of the long pit is carried out. In other words, by setting the reduction ratio of the height of the convex pit of the short pit (e.g., 2T pit) to be larger than that of the long pit, the asymmetry value can be controlled to decrease.

According to the embodiments of the present invention, it is possible to produce a large number of master stampers from a single matrix and use those master stampers in a disc production process. This is because, even when the master stamper is copied repetitively from a single matrix, even the master stampers formed later in time can be controlled so that an asymmetry value thereof is kept within a standard by the etching processing.

Therefore, an efficient disc production becomes possible using the large number of master stampers (or son stampers based on large number of master stampers).

Moreover, since the production of the matrix (mastering and development) is minimized (e.g., once), advantages in terms of efficiency and costs can be obtained. Accordingly, a productivity in mass-producing optical discs of the same content (e.g., same movie) can be improved prominently.

Further, even when the master stampers are copied repetitively from a single matrix, asymmetry values of the first two master stampers or so do not increase in particular. Thus, by carrying out the etching step on only the master stampers that require the etching processing, a processual load due to an addition of the etching step is prevented from increasing more than necessary, and a production efficiency as a whole can be improved.

These and other objects, features and advantages of the present invention will become more apparent in light of the following detailed description of best mode embodiments thereof, as illustrated in the accompanying drawings.

BRIEF DESCRIPTION OF DRAWINGS

FIG. 2 are explanatory diagrams for explaining a 1-layer disc production process according to the embodiment;

FIG. 3 are explanatory diagrams for explaining a 2-layer disc production process according to the embodiment;

FIG. 5 are explanatory diagrams for explaining a pit depth due to the etching process according to the embodiment;

DESCRIPTION OF PREFERRED EMBODIMENTS

Hereinafter, an embodiment of the present invention will be described in the following order while taking a read-only Blu-ray disc (BD-ROM) production process as an example.
(1. Brief overview of BD-ROM and applicability of embodiment)
(2. Disc production process)
(3. Stamper etching)
(1. Brief Overview of BD-ROM and Applicability of Embodiment)

As a disc size, a read-only Blu-ray disc (BD-ROM) has a diameter of 120 mm and a disc thickness of 1.2 mm.

In other words, in view of this point, the read-only Blu-ray disc is the same as a disc of a CD (Compact Disc) and a disc of a DVD (Digital Versatile Disc) in terms of an outer shape.

Moreover, so-called blue laser is used as laser for recording/reproduction, and an optical system having a high NA (e.g., NA=0.85) is used. In addition, a narrow track pitch (e.g., track pitch=0.32 µm) and a high linear density (e.g., recording density=0.12 µm) are realized. Accordingly, in a disc having a diameter of 12 cm, about 23 GB to 25 GB is realized as a user data capacity in a single recording layer.

In the BD-ROM, an emboss pit string is formed on a resin substrate (disc substrate) that is formed of polycarbonate or the like and has a thickness of, for example, about 1.1 mm, and a reflective film is deposited on a surface on which concavities and convexities are formed by the pit string, to thus form a recording layer. Moreover, a cover layer of about 100 μm is formed to thus form a disc having a thickness of 1.2 mm.

Further, as the BD-ROM, in addition to a 1-layer disc with a single recording layer, discs having a plurality of (2, 3, ..., n) recording layers are also being developed. Each recording layer is formed on a disc substrate via an intermediate layer. As a matter of course, a recording capacity can be significantly increased by providing a large number of recording layers.

This embodiment realizes a disc production method favorable for mass-producing BD-ROMs.

In particular, the disc production method of this embodiment can be effectively applied to a mass production of optical discs having the following characteristics.

(i) Disc compliant with system that uses objective lens with high NA (0.7 or more)

Figure 7:
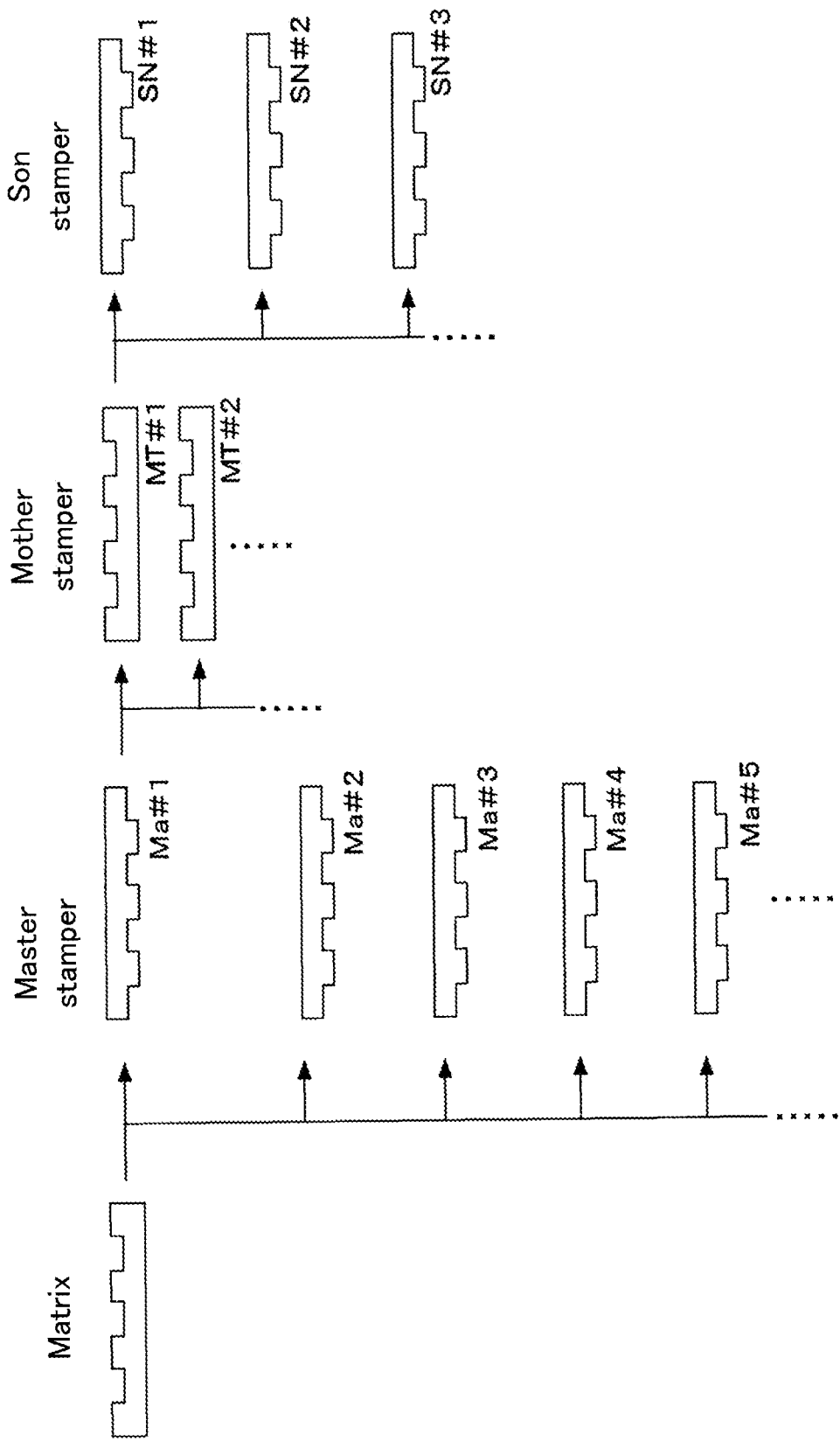
FIG. 7 is an explanatory diagram for explaining stamper copying in a mass production.
Figure 8:
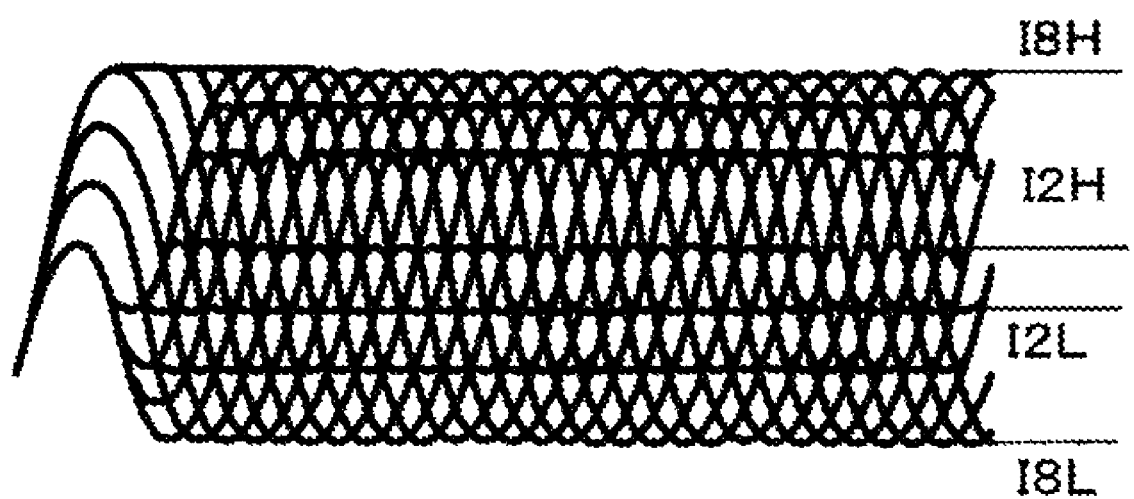
FIG. 8 is an explanatory diagram for explaining an eye pattern of a reproduction signal.

(ii) Read-only optical disc with index value called asymmetry whose value is restricted by standard (iii) Plastic disc onto which pattern is transferred using stamper obtained by subjecting matrix in which inorganic resist layer is formed on matrix substrate such as quartz glass and silicon wafer to nickel plating As a process of producing a BD-ROM having those characteristics, it is necessary to copy, when mass-producing discs, a large number of stampers from a single matrix by performing electrocasting processing a large number of times as described above with reference to FIG. 7. However, as described above, stampers obtained after the copying is repeated may be inappropriate to be used for producing disc substrates as they are. This is due to an increase of the asymmetry value in particular.

In this regard, in this embodiment, master stampers whose asymmetry increases due to the repetition of the electrocasting process are subjected to etching processing so as to reduce the asymmetry value.

(2. Disc Production Process)

Figure 1A:
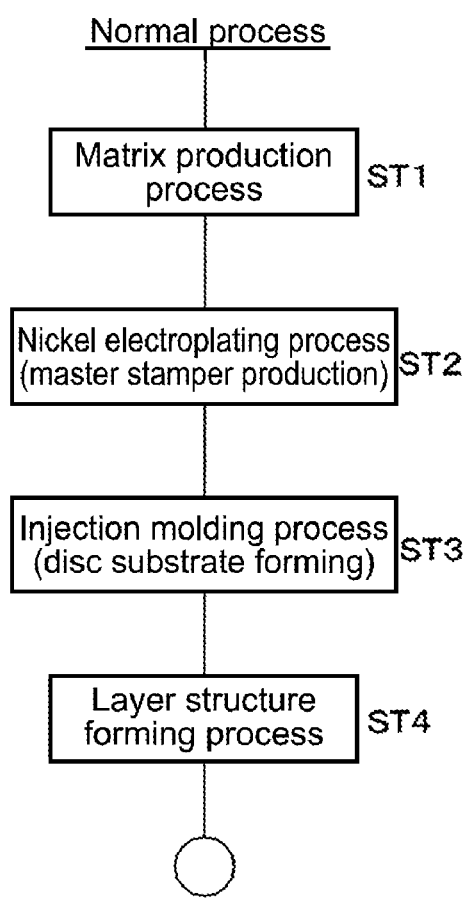
FIG. 1 are flowcharts of a disc production process according to an embodiment of the present invention.
Figure 1B:
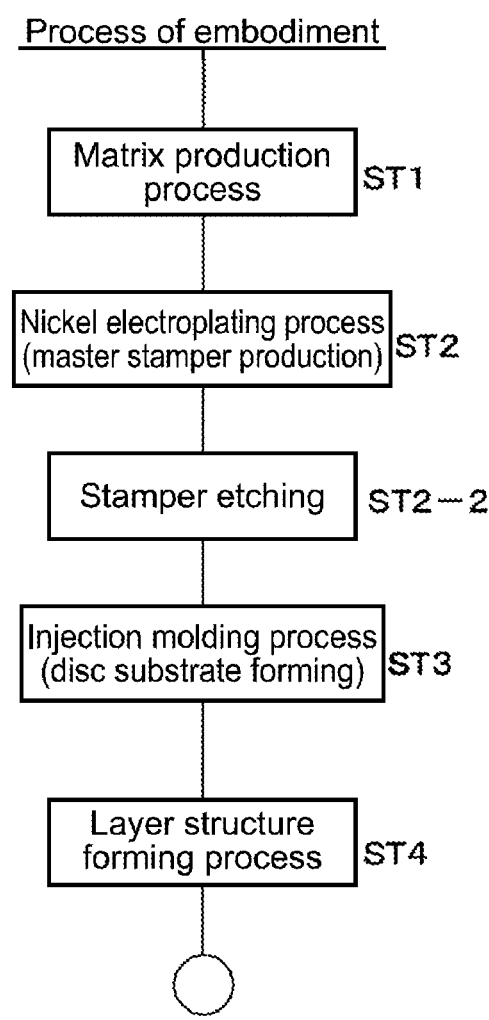

FIGS. 1A and 1B show a normal BD-ROM production process and a BD-ROM production process of this embodiment, respectively.

First, the normal optical disc (BD-ROM) production process will be described with reference to FIG. 1A.

The production process is largely divided into the following processes as shown in FIG. 1A.

Step ST1: Matrix production process
Step ST2: Nickel electroplating process
Step ST3: Injection molding process
Step ST4: Layer structure forming process In the matrix production process of Step ST1, an exposure is performed in a heat mode using an inorganic resist, and a pit pattern is thus drawn on a matrix. Then, development processing is carried out to form a matrix on which the exposed part corresponds to concave pits.

FIGS. 2A to 2D schematically show the matrix production process.

FIG. 2A shows a matrix substrate 100 constituting a disc matrix. A silicon wafer, quarts glass, and the like are used for the matrix substrate 100, for example.

On the matrix substrate 100, a heat storage layer 101 and an inorganic resist layer 102 are deposited by a sputtering method as shown in FIG. 2B.

Next, as shown in FIG. 2C, the inorganic resist layer 102 is subjected to a selective exposure corresponding to a pit string as a recording signal pattern using a mastering apparatus and sensitized.

Then, by developing the inorganic resist layer 102 using an organic alkaline developer, a matrix 103 on which a predetermined concavoconvex pit pattern (pit string configuration constituted of concave pits and spaces) is formed as shown in FIG. 2D is generated.

In this case, by adjusting an inorganic resist material, a thickness of the inorganic resist layer 102, and laser power or pulse width in the exposure that uses the mastering apparatus, a depth of the formed concave pit and a pit width thereof in a tangential and radial directions are controlled. The depth, the pit width, and the like of the concave pit on the matrix 103 are passed on almost as they are to an optical disc as a final product by a transfer thereafter.

In the nickel electroplating process of Step ST2, a stamper having concavities and convexities inversed from those of the matrix formed in Step ST1 is formed.

Specifically, as shown in FIG. 2E, on a concavoconvex surface of the generated matrix 103, a metallic nickel film is precipitated by electrocasting processing, and predetermined processing is performed after the metallic nickel film is peeled off from the matrix 103, to thus obtain a molding stamper 104 (master stamper Ma) onto which the pit string configuration of the matrix 103 is transferred (FIG. 2F). In the stamper 104, a part corresponding to the pit becomes convex.

It should be noted that for a mass production of discs, after one stamper 104 (master stamper Ma) is formed by one nickel electroplating process as described above with reference to FIG. 7, the nickel electroplating process is repeated using the matrix 103 to thus form a large number of master stampers Ma.

In addition, there may be a case where each of the large number of master stampers Ma is plated to form mother stampers MT having concavities and convexities inverted from those of the master stampers Ma, and further form son stampers SN having concavities and convexities inverted from those of the mother stampers MT.

In this case, the large number of master stampers Ma or son stampers SN can each be used as the molding stamper 104 shown in FIG. 2.

In the injection molding process of Step ST3, using the stampers 104 (master stampers Ma or son stampers SN) formed by the nickel electroplating process, a large number of plastic disc substrates having inverted concavities and convexities are formed.

Specifically, after placing the stamper in a mold, a disc substrate 105 formed of a resin such as polycarbonate as a thermoplastic resin is formed by injection molding using the stamper 104 as shown in FIG. 2G. Then, the stamper 104 is peeled off, and the disc substrate 105 shown in FIG. 2H is formed. Onto the disc substrate 105, the concavoconvex configuration of the stamper 104 is transferred inversely. In other words, similar to the matrix 103, a pit string constituted of concave pits is formed.

In the layer structure forming process of Step ST4, a predetermined layer structure is formed on each of a large amount of disc substrates 105 formed by the injection molding.

First, as shown in FIG. 2I, on a concavoconvex surface of the disc substrate 105, that is, on a surface on which the pit string configuration transferred from the stamper 104 is formed, a reflective film 106 is deposited by a sputtering method using Ag or an Ag alloy. By the concavoconvex pit string configuration and the reflective film 106, a recording layer L0 is formed.

Then, as shown in FIG. 2J, a cover layer 109 is formed on a laser incident side of the recording layer by, for example, spin coat of an ultraviolet-curable resin, a method that uses ultraviolet curing, a sheet adhesion method, and the like. Accordingly, a read-only optical disc (BD-ROM) is produced.

It should be noted that a hard coat layer may be additionally formed on a surface of the cover layer 109, or a damp-proof film may be formed on a surface thereof on the disc substrate 105 side (label printing surface side).

By the processes described above, a BD-ROM as a 1-layer disc including the recording layer L0 is produced as shown in FIG. 2J. In the case of a 2-layer disc, processes as shown in FIG. 3 are carried out.

FIGS. 3A to 3C show the injection molding process of Step ST3 of FIG. 1A, and the processes are the same as those of FIG. 2 up to this point. The stamper used in the injection molding process in this case is a stamper 104 (L0) as a first recording layer L0 on which a pit pattern is formed. Thus, onto a disc substrate 105 to be formed, a concavoconvex configuration as the first recording layer L0 is transferred.

In the case of producing a 2-layer disc, a plurality of recording layers are formed in the layer structure forming process of Step ST4.

First, as shown in FIG. 3D, on the concavoconvex surface of the disc substrate 105, that is, on the surface on which the pit string configuration transferred from the stamper 104 (L0) is formed, the reflective film 106 is formed by the sputtering method using Ag or an Ag alloy. With the concavoconvex pit string configuration and the reflective film 106, the first recording layer L0 is formed.

Next, as shown in FIG. 3E, by spin coat, for example, an ultraviolet-curable resin to be an intermediate layer 110 is deposited on the recording layer L0. Then, a stamper 104 (L1) of FIG. 3F is pressure-bonded to the ultraviolet-curable resin as shown in FIG. 3G, and the intermediate layer 110 is cured by being irradiated with ultraviolet rays in this state. After that, the stamper 104 (L1) is peeled off.

The stamper 104 (L1) is a stamper as a second recording layer L1 on which a pit pattern is formed. Therefore, onto the disc substrate 105 of FIG. 3H after the stamper is peeled off, a concavoconvex configuration as the second recording layer L1 is transferred.

After that, as shown in FIG. 3I, a semi-transmissive reflective film 111 is deposited on the surface on which the pit string configuration transferred from the stamper 104 (L1) is formed, by the sputtering method. Accordingly, the second recording layer L1 is formed.

Then, as shown in FIG. 3J, the cover layer 109 is formed on a laser incident side of the recording layer by, for example, spin coat of an ultraviolet-curable resin, a method that uses ultraviolet curing, and the like. Accordingly, a BD-ROM as the 2-layer disc is produced.

It should be noted that also in this case, a hard coat layer may be additionally formed on the surface of the cover layer 109, or a damp-proof film may be formed on the surface thereof on the disc substrate 105 side (label printing surface side).

Moreover, in the case of producing an optical disc having 3 or more recording layers, the processes of FIGS. 3E to 3I are repeated.

The disc production process of this embodiment is shown in FIG. 1B, but processes of Steps ST1, ST2, ST3, and ST4 are the same as those of the normal process.

However, in the process of FIG. 1B, a stamper etching process shown in Step ST 2-2 is performed on the stamper 104 (master stamper Ma) formed by the nickel electroplating process.

For example, the nickel electroplating process of Step ST2 is repeated a plurality of times using a single matrix 103 to thus form a large number of master stampers Ma.

In this case, for the master stampers Ma formed after a predetermined number of master stampers Ma are copied, the stamper etching process (ST2-2) is carried out as shown in FIG. 1B.

This is for lowering asymmetry values by the etching processing since the master stampers Ma formed after the predetermined number of master stampers Ma are copied are unfit for practical use as they are due to an increase in the asymmetry values.

In other words, as the whole production process in a disc manufacturing plant, for example, focusing on the first master stamper Ma, the second master stamper Ma, and the like that have been formed at an initial stage, the disc production process becomes the process as shown in FIG. 1A. On the other hand, focusing on the master stampers Ma formed after the predetermined number of master stampers Ma are copied like the third master stamper Ma and subsequent master stampers Ma, the disc production process becomes the process as shown in FIG. 1B.

In an actual manufacturing plant, a large number of master stampers Ma and son stampers SN are used as the stampers 104 (or 104 (L0)) for transfer in the injection molding as shown in FIGS. 2G and 3B.

As the stampers 104 (or 104 (L0)), the master stampers Ma that have been subjected to the stamper etching and those that have not been subjected to the stamper etching are used in parallel. In other words, optical discs produced by the process shown in FIG. 1A and optical discs produced by the process shown in FIG. 1B coexist.

In the case of using the son stampers SN, the son stampers SN formed based on the master stampers Ma that have been subjected to the stamper etching and the son stampers SN formed based on the master stampers Ma that have not been subjected to the stamper etching are used in parallel.

The same holds true for the stamper 104 (L1) shown in FIGS. 3F and 3G for molding the second recording layer L1. For the master stampers Ma as the stampers 104 (L1), those that have been subjected to the stamper etching and those that have not been subjected to the stamper etching are used in parallel. In the case of the son stampers SN, those produced based on the master stampers Ma that have been subjected to the stamper etching and those formed based on the master stampers Ma that have not been subjected to the stamper etching are used in parallel.

The stamper etching will be described below in detail.

(3. Stamper Etching)

Figure 9A:
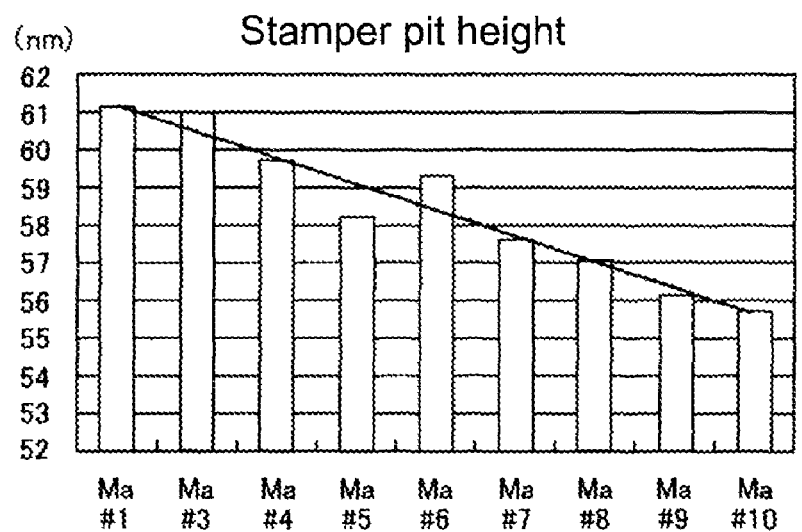
FIG. 9 are explanatory diagrams for explaining a decrease in a pit height of a convex pit in a case where copying is repeated.
Figure 9B:
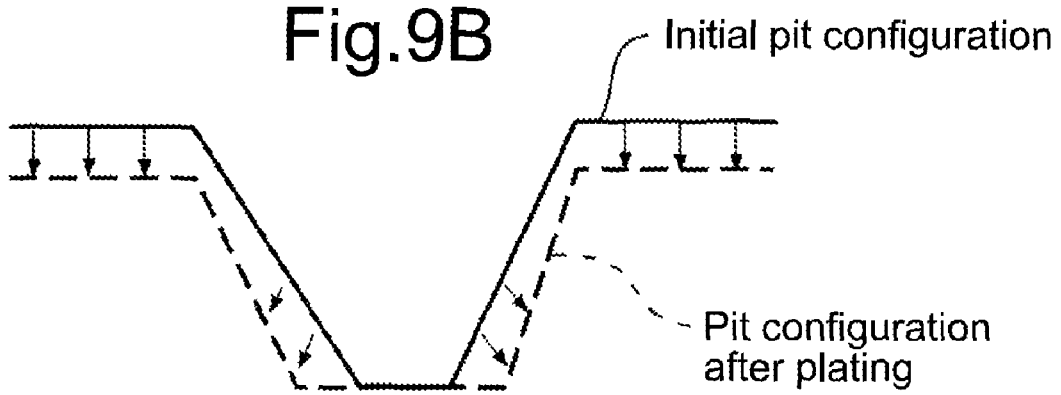

With reference to FIG. 9, the description has been given on the case where, by repeating the copying of the master stampers Ma, the height of the convex pits becomes smaller for the master stampers Ma copied later in time.

Figure 10A:
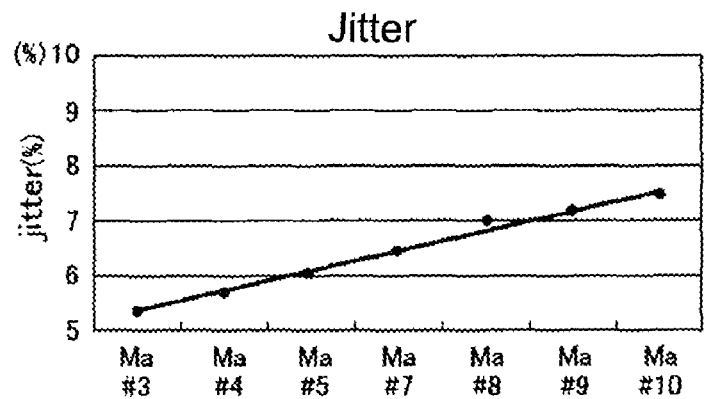
FIG. 10 are explanatory diagrams for explaining deterioration of signal characteristics in the case where copying is repeated.
Figure 10B:
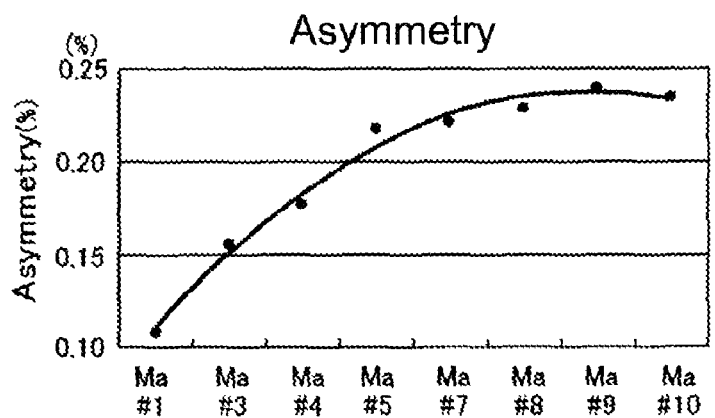
Figure 10C:
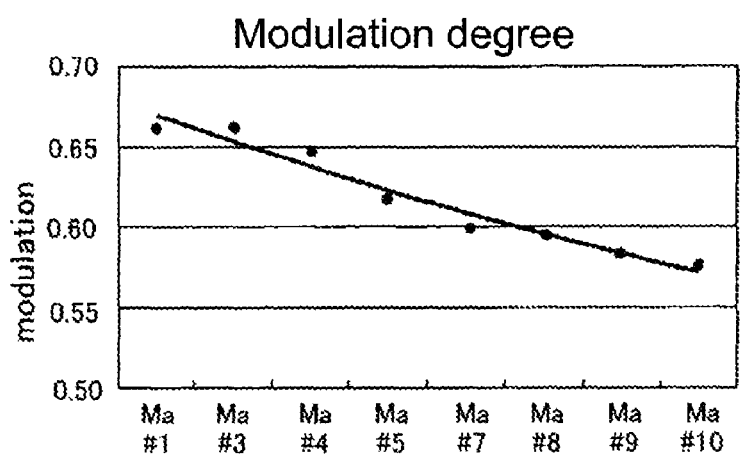

As shown in FIG. 10B, the later in time the master stamper Ma is copied, the higher the asymmetry value of the optical disc that has used that master stamper Ma becomes to go below the standard.

The increase of the asymmetry value is due to the following reasons.

The pit heights of the convex pits of the master stampers Ma decrease almost equally for the short pit of a 2T pit and the like and the long pit of an 8T pit and the like, as the copying is repeated.

When the pit height becomes smaller (shallow pit regarding BD-ROM as final product), a bottom level of a signal amplitude corresponding to the pit increases.

However, in relation to the MTF, the increase of the bottom level is small for the 2T pit and increases along with an increase of the pit width.

Here, the asymmetry is expressed by $\{(I8H+I8L)-(I2H+I2L)\}/\{2(I8H-I8L)\}$.

In this expression, the increase of the bottom level is expressed as an increase of "I8L" and "I2L", but a pace of increase of the value of "I8L" is prominently larger than that of the value of "I2L". As a result, the increase of the asymmetry value expressed by the above expression occurs.

In other words, although, physically, the pit heights (pit depth) of the 2T pit and the 8T pit decrease almost equally, a rise of the bottom level of the 8T pit is prominent in terms of the reproduction signal, with the result that the asymmetry value increases.

The asymmetry value indicates a deviation of a center axis of the 8T signal and the 2T signal, and the increase of the asymmetry value destabilizes the binarization processing of the reproduction signal.

For enabling the master stampers Ma whose asymmetry values increase as described above to be provided for practical use, the height of the convex pit of the master stampers Ma only needs to be controlled as appropriate by the etching processing.

In other words, the pit height is processed by the etching processing so that the reduction ratio of the height of the 2T pit becomes larger than that of the height of the 8T pit.

When the 2T pit is grinded down largely as compared to the 8T pit by the etching processing to reduce the height thereof and the reduction ratio of the height of the convex pit of the 2T pit is made larger than that of the height of the long pit, a rise of the bottom level of the reproduction signal corresponding to the 2T pit becomes large. Specifically, an increase of the value of "I2L" in the above expression becomes large. In other words, the etching processing operates to reduce the asymmetry value.

Hereinafter, descriptions will be given using an experimental example.

An etching apparatus used herein is "IE-500" (Victor Company of Japan, Limited) with a working distance of 40 mm. Processing contents are as follows.
(1) In an atmosphere of 10 Pa of Ar gas, an RF discharge of inputting 150-W power for 30 sec is carried out.
(2) In an atmosphere of 10 Pa of $O_2$ gas, an RF discharge of inputting 150-W power for 30 sec is carried out.

The processes of the items (1) and (2) were carried out in the stated order and regarded as one set.

It should be noted that the dry etching of the item (2) that uses an oxygen plasma is carried out for cleaning, and fine particles adhered onto a target surface is blown off as oxides. This is effective for removing organic substances since it uses an active operation of oxygen (operation for blowing off organic substances as $CO_2$).

The dry etching that uses an oxygen plasma is not essential. For improving the asymmetry value, at least the dry etching of the item (1) that uses an argon plasma only needs to be carried out. However, a stamper of a higher quality can be formed by the cleaning effect of the dry etching that uses an oxygen plasma.

In the dry etching of the item (1) that uses an argon plasma, sputtering of a target is carried out.

By this process, the target (i.e., master stamper Ma in this example) is processed into an arbitrary shape.

Since a sputtering efficiency (target sputtering amount) generally becomes higher as a mass of a plasma atom increases, inexpensive and stable Ar (atomic weight 40) as rare gas is often used.

It should be noted that although argon gas is used in this case, xenon gas, krypton gas, or the like may be used instead.

Normally, the dry etching that uses a plasma is carried out so that discharge-dissociated ions are uniformly sputtered on the target to thus grind down a certain amount (thickness) of substances deposited on the surface.

However, when an electric field is applied to the target having concavities and convexities on the surface (convex pits on stamper), the electric field concentrates at a portion where the change in the configuration is intense (pit edge portion, short pit (e.g., 2T pit) itself), and an ion collision frequency increases locally.

By using this fact, the pit height can be controlled arbitrarily.

Figure 4:
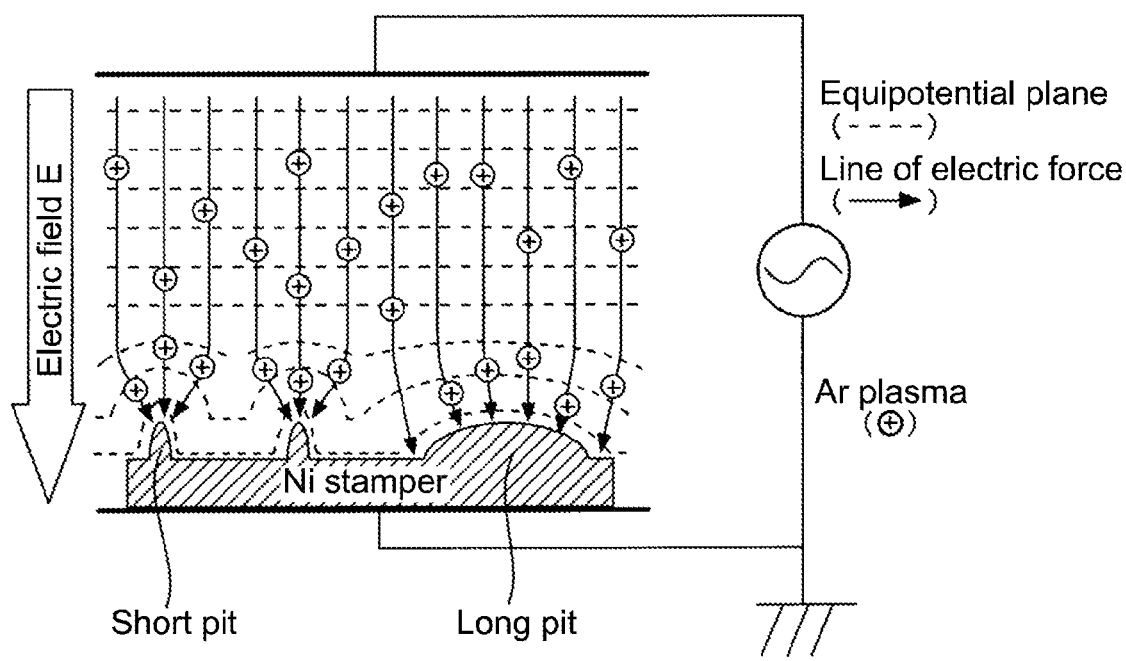
FIG. 4 is an explanatory diagram for explaining an etching process according to the embodiment.

A conceptual diagram thereof is shown in FIG. 4.

When an electric field E is applied to parallel plates, equipotential planes (indicated by broken lines) parallel to the plates are formed. However, when a polar plate (i.e., nickel stamper side) has concavities and convexities as shown in the figure, equipotential planes are formed along that shape.

Lines of an electric force that indicate a direction of the electric field ("→" in figure) proceed in a direction perpendicular to the equipotential planes, and charged particles are accelerated along the lines of the electric force.

Thus, the short pit with an intense change in the configuration has a large curvature of the equipotential planes and a large curve in the lines of the electric force, with the result that more charged particles collide concentrically.

Accordingly, it is possible to control a relative grinding amount of the short pit and the long pit.

FIG. 5A shows an observation image of a disc substrate formed of a polycarbonate resin, that has been injection-molded using a master stamper obtained from a matrix via the nickel electroplating process. Moreover, FIG. 5B shows an observation image of a disc substrate injection-molded from the same master stamper that has additionally been subjected to the etching processing. It should be noted that FIGS. 5A and 5B show as diagrams surfaces of concavoconvex surfaces of pits as AFM observation images and cross sections of a long pit and a 2T pit.

In a disc substrate formed from an unetched stamper as shown in FIG. 5A, a depth of the long pit was 63 nm, and a depth of the 2T pit was 49 nm.

On the other hand, in a disc substrate formed from a stamper subjected to the etching processing as shown in FIG. 5B, the depth of the long pit was 58 nm, and the depth of the 2T pit was 42 nm.

In view of the above, it can be confirmed that the etching processing has an effect of grinding down the convex pit of the stamper.

Moreover, while about 5 nm was grinded down in the long pit, about 7 nm was grinded down in the 2T pit.

This is due to the fact that, because of the electric field concentrating at a portion at which the configuration changes precipitously and collisions of Ar ions being increased locally, it has operated to reduce the size of the pit.

In particular, since the 2T pit has a precipitous change in the configuration in both the radial direction and the tangential direction, it can be expected that the electric field is apt to concentrate locally and plasma collisions occur frequently, with the result that the reduction ratio becomes relatively prominent.

Using this effect, with respect to the master stampers Ma whose asymmetry values are not up to the standard due to the change in the pit configuration by the repetition of the nickel electroplating process, the 2T pit can be processed to be relatively small to thus reduce the asymmetry value.

Figure 6A:
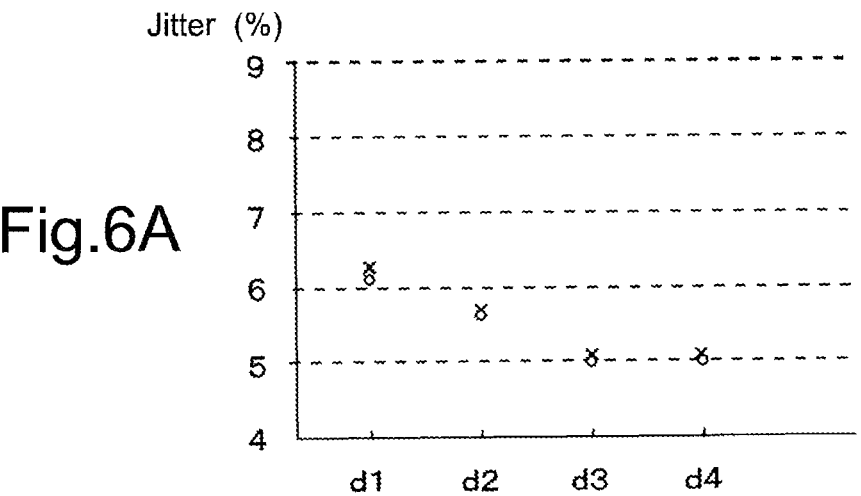
FIG. 6 are explanatory diagrams for explaining signal characteristics in a case where the etching process according to the embodiment is added.
Figure 6B:
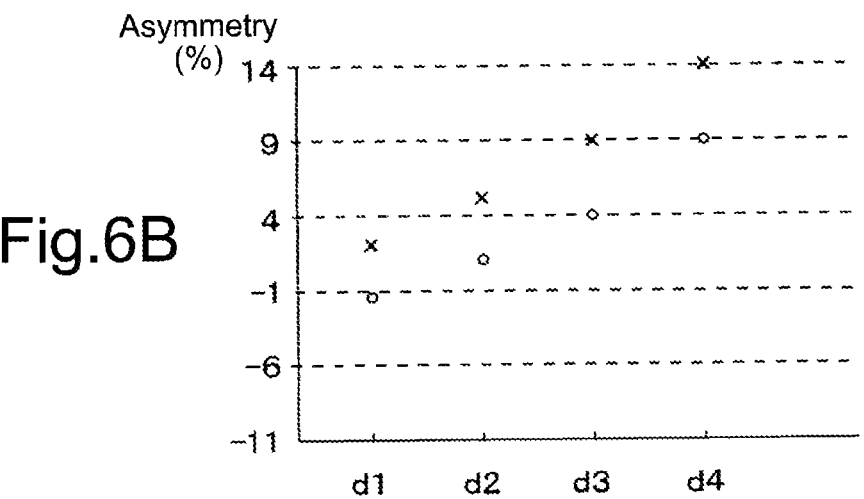

FIGS. 6A and 6B show measurement results of jitter and asymmetry in an optical disc that has used the stamper subjected to the etching processing and an optical disc that has used the unetched stamper.

It should be noted that in the experiment, stampers obtained by using 4 types of mastering power were measured.

Specifically, laser power in the matrix production process was changed in 4 steps to thus form 4 types of stampers having different initial pit configurations.

Then, two optical discs produced based on the stampers obtained before and after the etching were used as measurement targets. "d1" is a measurement result of the two optical discs produced based on the stampers obtained before and after the etching in a case of lowest mastering power, and "d4" is a measurement result of the two optical discs produced based on the stampers obtained before and after the etching in a case of highest mastering power. ○ indicates a characteristic value of the optical disc produced from the stamper obtained after the etching, and x indicates a characteristic value of the optical disc produced from the stamper obtained before the etching. An Ag alloy was used for the reflective film of both the optical discs.

It should be noted that the AFM images shown in FIG. 5 are images of the optical discs produced from the stampers obtained before and after the etching, that correspond to "d2".

First, it can be seen from FIG. 6A that the jitter is not adversely affected by the etching processing.

Moreover, it can be confirmed from FIG. 6B that by performing the etching processing, the asymmetry value can be reduced about 3% to 5% irrespective of the initial pit configuration.

In view of the above, it can be seen that even when the master stampers whose asymmetry is 15% or more and not up to the standard are produced, by performing the etching processing, the asymmetry value can be set to a value within the standard without enhancing the jitter.

As can be understood from the descriptions above, even when the asymmetry values of the master stampers Ma formed later in time are not up to the standard in a case where a large number of master stampers Ma are copied from a matrix, by adding the etching processing, the asymmetry values can be set to values within the standard.

In other words, it is possible to solve the problem on the increase of the asymmetry values due to the mass copying of the master stampers, and actually use the large number of master stampers Ma in the injection molding (or use them in forming mother stampers MT or son stampers SN).

Therefore, a process of mastering a matrix of the same content again can be omitted. Moreover, since the asymmetry values of the first few master stampers Ma that have been copied are within the standard, those master stampers Ma do not need to be subjected to the etching processing.

Accordingly, a productivity can be prominently improved in the entire disc production process.

Further, also for the stampers for forming concavities and convexities of the recording layers in the case of the 2-layer disc (or disc with 3 or more layers) described with reference to FIG. 3, the stampers at the copying stage at which an increase in the asymmetry values occurs are used after being subjected to the etching processing. Accordingly, it becomes possible to efficiently produce multiple-layer discs.

It should be noted that the above embodiment has been described assuming that the etching processing is performed on the master stampers Ma, which is because the pit height of the master stampers Ma becomes smaller as the pit on the matrix side becomes shallower along with the repetitive copying from the matrix.

On the other hand, when the copying process of the nickel stampers is carried out in the stated order of the master stampers Ma, the mother stampers MT, and the son stampers SN, the pit height (depth) hardly becomes smaller along with the repetitive copying. However, when the asymmetry values are expected to increase in the case of the son stampers SN formed based on the master stampers Ma that have not been subjected to the etching processing, for example, those son stampers SN may be subjected to the etching processing.

The present application contains subject matter related to that disclosed in Japanese Priority Patent Application JP 2009-009519 filed in the Japan Patent Office on Jan. 20, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A stamper production method comprising:
a first stamper forming step of producing, by electroplating processing using a matrix in which a pit string comprising at least a first concave pit and a second concave pit is formed on an inorganic resist layer based on recording information, a first set of stampers, each stamper of the first set of stampers having a first convex pit corresponding to the first concave pit and a second convex pit corresponding to the second concave pit, wherein the second convex pit is longer than the first convex pit;
a second stamper forming step, performed after the first stamper forming step, of producing, by electroplating processing using the matrix, a second set of stampers, each stamper of the second set of stampers having a first convex pit corresponding to the first concave pit and a second convex pit corresponding to the second concave pit, wherein the second convex pit is longer than the first convex pit;
an etching step of carrying out etching processing on the second set of stampers so that a first pit height of the first convex pit of each stamper of the second set of stampers is reduced more than a second pit height of the second convex pit of each stamper of the second set of stampers,
wherein the first set of stampers are not subjected to etching processing.

2. The stamper production method according to claim 1, wherein the etching step is carried out as dry etching that uses an argon plasma.

3. The stamper production method according to claim 2, wherein the etching step comprises carrying out dry etching using an oxygen plasma after the dry etching that uses the argon plasma.

4. A read-only optical disc production method comprising:
a matrix production step of producing, by performing a pit pattern exposure by irradiating recording laser light that is based on recording information onto an inorganic resist layer of a matrix substrate and performing development processing after the exposure, a matrix in which a pit string comprising at least a first concave pit and a second concave pit is formed on the inorganic resist layer based on the recording information;

a first stamper forming step of producing, by electroplating processing using the matrix, a first set of stampers, each stamper of the first set of stampers having a first convex pit corresponding to the first concave pit and a second convex pit corresponding to the second concave pit, wherein the second convex pit is longer than the first convex pit;

a second stamper forming step, performed after the first stamper forming step, of producing, by electroplating processing using the matrix, a second set of stampers, each stamper of the second set of stampers having a first convex pit corresponding to the first concave pit and a second convex pit corresponding to the second concave pit, wherein the second convex pit is longer than the first convex pit;

an etching step of carrying out etching processing on the second set of stampers so that a first pit height of the first convex pit of each stamper of the second set of stampers is reduced more than a second pit height of the second convex pit of each stamper of the second set of stampers, wherein the first set of stampers are not subjected to etching processing and each stamper of the first set of stampers is an unetched stamper;

a disc substrate preparation step, performed after the etching step, of preparing, using each stamper of the first set of stampers and each etched stamper of the second set of stampers, a plurality of disc substrates, onto which the first concave pit corresponding to the first convex pit and the second concave pit corresponding to the second convex pit is transferred; and a layer structure forming step of forming a layer structure on each of the disc substrates to produce a read-only optical disc.

5. The read-only optical disc production method according to claim 4,
wherein forming the layer structure forming step includes forming a recording layer by depositing a reflective film on a surface of each of the disc substrates on which the pit string is formed, and fanning a cover layer on the recording layer.

6. The read-only optical disc production method according to claim 4, wherein forming the layer structure forming step includes:
depositing a reflective film on a surface of each of the disc substrates on which the pit string is formed to thus obtain a first recording layer,
forming, after obtaining the first recording layer, a second recording layer and subsequent recording layers via an intermediate layer by a pit string transfer using a different stamper produced through producing the matrix production step and the first or second stamper forming step and a deposition of a semi-transmissive reflective film, and
forming a cover layer on a last recording layer each of the disc substrates.

7. A read-only optical disc production method for mass-producing read-only optical discs having the same information content, the method comprising acts of:
producing, by performing a pit pattern exposure by irradiating recording laser light that is based on recording information onto an inorganic resist layer of a matrix substrate and performing development processing after the exposure, a matrix in which a pit string comprising at least a first concave pit and a second concave pit is formed on the inorganic resist layer based on the recording information;
producing, by performing electroplating processing a plurality of times using the matrix, a first plurality of stampers on each of which a first convex pit corresponding to the first concave pit and a second convex pit corresponding to the second concave pit is formed, wherein the second convex pit is longer than the first convex pit;
producing, after producing the first plurality of stampers, by performing electroplating processing a plurality of times using the matrix, a second plurality of stampers on each of which a first convex pit corresponding to the first concave pit and a second convex pit corresponding to the second concave pit is formed, wherein the second convex pit is longer than the first convex pit;
carrying out etching processing on the second plurality of stampers so that a first pit height of the first convex pit is reduced more than a second pit height of the second convex pit, wherein the first plurality of stampers are not subjected to etching processing;
preparing, using a first stamper from the second plurality of stampers that has been subjected to the etching processing and a second stamper from the first plurality of stampers that has not been subjected to the etching processing in parallel, a first disc substrate for the first stamper and a second disc substrate for the second stamper onto which the first concave pit corresponding to the first convex pit and the second concave pit corresponding to the second convex pit is transferred; and
forming a layer structure on the first disc substrate, to produce a first read-only optical disc and forming a layer structure on the second disc substrate, to produce a second read-only optical disc.

* * * * *